United States Patent [19]

Asano et al.

[11] Patent Number: 4,534,803

[45] Date of Patent: Aug. 13, 1985

[54] METHOD OF CLEANING MACHINED SURFACE AND CHIP REMOVING TOOL

[75] Inventors: Hiroshige Asano, Kani; Masayuki Moroto, Mie, both of Japan

[73] Assignee: Okuma Machinery Works Ltd., Kita, Japan

[21] Appl. No.: 543,616

[22] Filed: Oct. 20, 1983

[30] Foreign Application Priority Data

Oct. 23, 1982 [JP] Japan .................. 57-186592

[51] Int. Cl.³ .................. B08B 3/02; B08B 5/00
[52] U.S. Cl. .................. 134/30; 134/36; 134/37; 134/102; 134/172; 408/60; 409/137
[58] Field of Search .................. 134/36, 37, 94, 99, 134/172, 199, 30, 102; 408/56-61; 409/137; 239/8, 423

[56] References Cited

U.S. PATENT DOCUMENTS

| | | | |
|---|---|---|---|
| 2,723,405 | 11/1955 | Woodward | 408/61 |
| 3,398,609 | 8/1968 | Schott | 408/61 |
| 3,893,399 | 7/1975 | Maastricht | 408/60 |

OTHER PUBLICATIONS

"Machine Work Centers: The First Ones Without Any Operator" *Machine Production* (pp. 28, 29 and 33) Bulogne, France, Nov. 26, 1976.

*Primary Examiner*—Richard V. Fisher
*Assistant Examiner*—W. Gary Jones
*Attorney, Agent, or Firm*—Henry Sternberg

[57] ABSTRACT

A method of cleaning a machined surface comprises: mounting a chip removing tool having two flow paths for compressed air and cooling water, respectively, on a main spindle of a machining center; and simultaneously jetting out the compressed air and cooling water from a mutual outlet, thereby to remove chips attached to a machined surface of a workpiece.

A chip removing tool, for use in the above method, which includes a rotatable body attachable to a main spindle of a machining center, has a casing and compressed gas and liquid supply in the casing.

3 Claims, 4 Drawing Figures

4,534,803

METHOD OF CLEANING MACHINED SURFACE AND CHIP REMOVING TOOL

BACKGROUND OF THE INVENTION

1. Field of the Invention

The present invention relates to a method of cleaning a machined surface for removing chips attached to a machined surface of a workpiece after it has been subjected to a cutting at a machining center, and a chip removing tool employed in this method.

2. Description of the Prior Art

To automatically measure a machined surface of a workpiece after it has been subjected to a cutting at a machining center, first, chips attached to the machined surface must be removed. For the removal of the chips, such methods have conventionally been employed as blowing away the chips by means of compressed air and as flushing away the chips by means of flowing water. However, there are cases where the chips having stuck to the machined surface due to the cooling water used in cutting cannot be removed by employing the above-mentioned methods independently of each other.

SUMMARY OF THE INVENTION

Accordingly, it is an object of the invention to provide a method of cleaning a machined surface which makes it possible to excellently remove chips attached to a machined surface of a workpiece, and a chip removing tool employed in this method, thereby to overcome the above-mentioned disadvantage of the prior art.

To this end, according to one aspect of the invention, there is provided a method of cleaning a machined surface comprising: mounting a chip removing tool having two flow paths for compressed air and cooling water, respectively, on a main spindle of a machining center; and simultaneously jetting out said compressed air and cooling water from a mutual outlet, thereby to remove chips attached to a machined surface of a workpiece.

It is preferable that after the compressed air and the cooling water are simultaneously jetted out from the mutual outlet to remove the chips attached to the machined surface as mentioned above, only the compressed air should be jetted out from the mutual outlet to dry the machined surface.

Moreover, the removal of the chips attached to the machined surface may be effected while the mutual outlet is rotated by revolving the main spindle.

According to another aspect of the invention, there is provided a chip removing tool comprising: a body having an upper end adapted to be attached to a main spindle of a machining center; a casing surrounding the outer periphery of the body and adapted to be rotatable with respect to the body; a compressed air intake member having a lower part unrotatably fitted in the casing, the compressed air intake member being longitudinally movable between a projecting position taken when it is moved upwardly and a retracting position taken when it is moved downwardly, the compressed air intake member being constantly urged toward the projecting position by a spring; a mutual engagement means adapted to lock both the body and the compressed air intake member so that they cannot rotate relatively to each other, only when the compressed air intake member is in the projecting position, thereby to lock the casing so that it cannot rotate with respect to the body; a cooling water intake member having a lower part secured in the casing; an air flow path longitudinally extending through the compressed air intake member and passing through the casing and then downwardly extending through the body to communicate with an outlet provided in the vicinity of the lower end of the body; and a cooling water flow path longitudinally extending through the cooling water intake member and passing through the casing and then downwardly extending through the body to communicate with the outlet, wherein, when the upper end of the body is attached to the main spindle, the compressed air intake member abuts a first joint having an air inlet passage and provided on the spindle head of the machining center and is moved to the retracting position, and the air inlet passage and the air flow path are allowed to communicate with each other, and at the same time, the cooling water intake member is allowed to communicate with a cooling water inlet passage formed in a second joint provided on the spindle head.

The above and other objects, features and advantages of the invention will become clear from the following description of the preferred embodiment taken in conjunction with the accompanying drawings.

DETAILED DESCRIPTION OF THE PREFERRED EMBODIMENT

A preferred embodiment of the invention will be described hereinunder with reference to the accompanying drawings.

Figure 1:
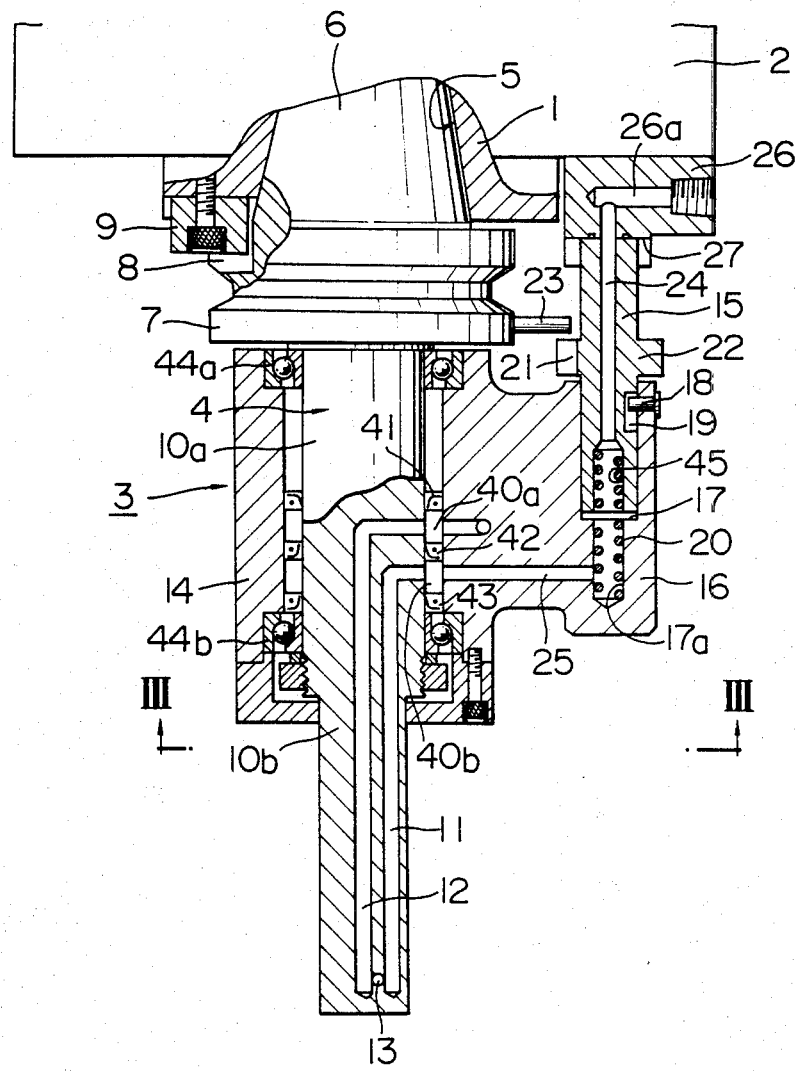
FIG. 1 is a longitudinal sectional view of an embodiment of a chip removing tool employed in a method of cleaning a machined surface in accordance with the invention, taken along a plane including a compressed air intake member.

Referring first to FIG. 1, a main spindle 1 is rotatably carried inside a spindle head 2 of a machining center. A chip removing tool 3 is adapted to be mounted on the end of the main spindle 1 and is housed in a tool magazine, not shown, similarly to other cutting tools when it is not used. When the chip removing tool 3 is necessary to use, it is carried by a tool changer, not shown, to the position of the main spindle 1 and mounted thereon. A body 4 of the chip removing tool 3 has at one end thereof (the upper end as viewed in FIG. 1) a tapered shank 6 fitted into an end tapered hole 5 formed in the main spindle 1. The body 4 further has at the lower end of the shank 6 a flange portion 7 provided with an annular groove of V-shaped cross-section which can be gripped by an arm gripper of the tool changer. The flange portion 7 is cut to have a key groove 8 in engagement with a key 9 secured to the lower end surface of the main spindle 1. Moreover, the body 4 has a larger-diameter portion 10a downwardly extending from the position of the flange portion 7, and a smaller-diameter portion 10b downwardly extending from the lower end of the larger-diameter portion 10a. Inside the portions 10a, 10b, flow paths 11 and 12 are formed. The flow path 12 extends longitudinally of the body 4 along the central axis thereof from a substantially central position, in the longitudinal direction, of the larger-diameter portion 10a to the vicinity of the lower end of the smaller-diameter portion 10b. The flow path 12 bends at its upper end position so as to extend radially of the body 4 and open into that portion 40a of an annular space defined between the body 4 and a casing 14 surrounding the same which is partitioned by a pair of sealing members 41, 42. The lower end of the flow path 12 communicates with a single outlet 13 which is formed in the vicinity of the lower end of the smaller-diameter portion 10b and opened to the outside. On the other hand, the flow path 11 extends longitudinally of the body 4 while being adjacent to the flow path 12 with a distance therefrom in the radial direction of the body 4. The flow path 11 bends at its upper end located in the larger-diameter portion 10a so as to extend radially of the body 4 and open into that portion 40b of the annular space defined between the body 4 and the casing 14 which is partitioned by a pair of sealing members 42, 43. In addition, the lower end of the flow path 11 communicates with the outlet 13.

The casing 14 is mounted on the outside of the larger-diameter portion 10a of the body 4 through a pair of bearings 44a, 44b so as to be rotatable relatively to the body 4. The casing 14 has a projection 16 projecting radially outward. The projection 16 has a hole 17 which is opened upwardly. In this hole 17, a compressed air intake member 15 is received so as to be movable axially of the tool 3. The projection 16 of the casing 14 is provided with a stud pin 18, which has its inner end inserted into a key groove 19 of the compressed air intake member 15 to control the axial movement of the compressed air intake member 15 as well as prevent the rotation thereof in the hole 17. A compression spring 20 for constantly urging the compressed air intake member 15 toward the shank 6, i.e., toward the upper side as viewed in FIG. 1 is fitted in the lower end portion 17a of the hole 17 and a hole 45 formed in the bottom portion of the compressed air intake member 15. The compressed air intake member 15 has a collar portion 22 formed at a portion thereof which is outside the projection 16 and adjacent to the upper end of the projection 16. The collar portion 22 has a groove-like notch 21 opened toward the central axis of the tool 3, i.e., toward the left side as viewed in FIG. 1. When the chip removing tool 3 is removed from the main spindle 1 and the compressed air intake member 15 is moved toward the shank 6. i.e., toward the upper side as viewed in FIG. 1 by the force of the compression spring 20, the notch 21 engages with a stud pin 23 provided on the flange portion 7 of the body 4 to prevent the casing 14 from rotating with respect to the body 4. Thus, the relationship between the angular position of the casing 14 and that of the key groove 8 of the flange portion 7 is maintained constant. The compressed air intake member 15 has a flow path 24 bored in its center and extending longitudinally thereof. The lower end of the flow path 24 communicates with the flow path 11 formed in the body 4 through the holes 45, 17a, a flow path 25 bored in the casing 14 and the annular space portion 40b. A joint 26 for a compressed air is attached to the lower end surface of the spindle head 2. An inlet passage 26a for introducing compressed air is formed in the joint 26. The passage 26a is adapted to communicate with the flow path 24 in the compressed air intake member 15 when the chip removing tool 3 is mounted on the main spindle 1 and the upper end surface of the compressed air intake member 15 and the lower end surface of the joint 26 abut on each other. Accordingly, by sending compressed air into the passage 26a from a compressor, not shown, the compressed air can be sent into the tool 3. In addition, the joint 26 has a groove 27 formed at its lower end portion for receiving the end of the compressed air intake member 15 to prevent the rotation of the casing 14.

Figure 2:
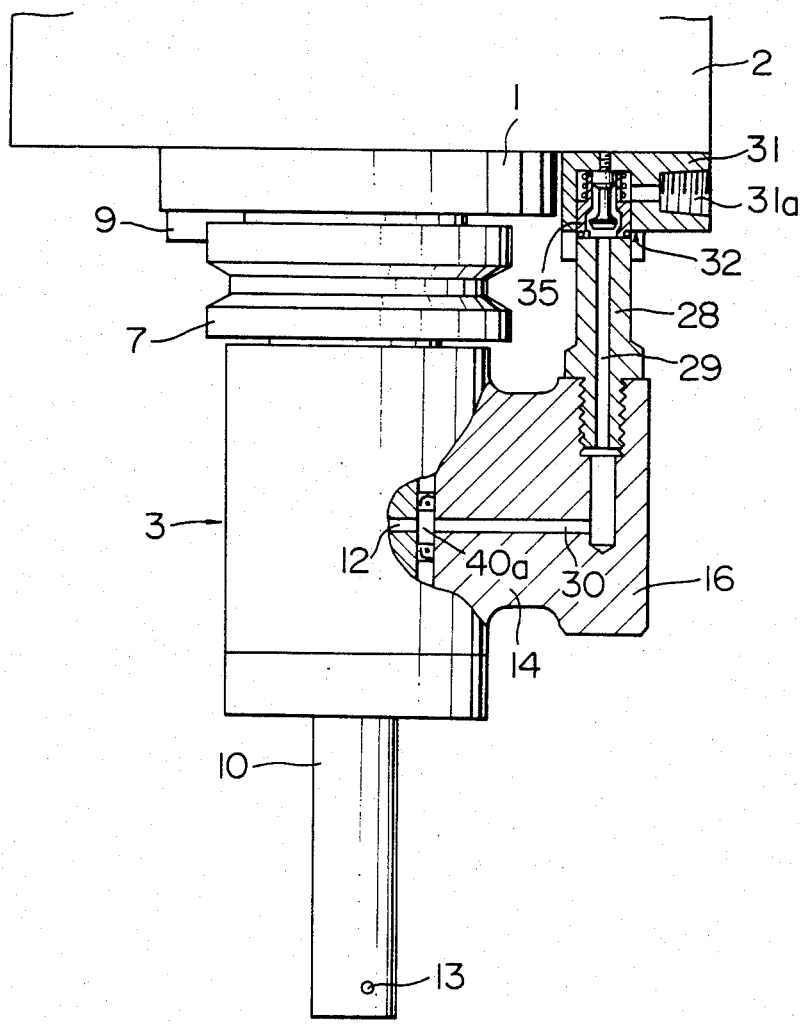
FIG. 2 is a partly-sectioned front elevational view showing the construction of a cooling water intake member of the chip removing tool shown in FIG. 1.
Figure 3:
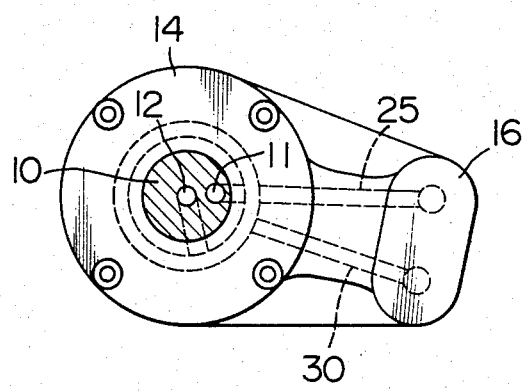
FIG. 3 is a partly sectional view of the chip removing tool shown in FIG. 1 taken along the line III—III of FIG. 1.

As will be understood from FIGS. 2 and 3, a cooling water intake member 28 is secured to the projection 16 of the casing 14 in juxtaposition with the compressed air intake member 15. The cooling water intake member 28 has a flow path 29 formed therein extending longitudinally thereof. The flow path 29 communicates with the flow path 12 in the body 14 through a flow path 30 formed in the casing 14 and the annular space portion 40a. Moreover, a joint 31 for a cooling water which has an inlet passage 31a is attached to the lower end surface of the spindle head 2. A bushing member 35, described later, is fitted into the joint 31. The upper end surface of the cooling water intake member 28 abuts on the lower end surface of the bushing member 35 when the chip removing tool 3 is mounted on the main spindle 1. In addition, the joint 31 has a groove 32 formed in its lower end surface for receiving the upper end of the cooling water intake member 28 to prevent the rotation of the casing 14.

Figure 4:
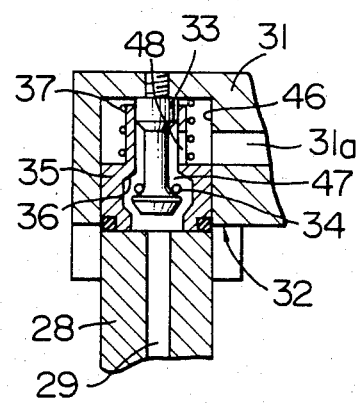
FIG. 4 is an enlarged detailed sectional view showing the construction of a joint for a cooling water passage and a valve means fitted therein which are shown in FIG. 2.

As shown in FIGS. 2 and 4, the joint 31 has a hole 46 communicating with the inlet passage 31a as well as opening downwardly. A stud bolt 33 is screwed to the top wall of the hole 46. The stud bolt 33 extends downwardly through the hole 46 so that the lower end of the stud bolt 33 faces the upper end of the cooling water intake member 28. The stud bolt 33 has a larger-diameter portion at its lower end, and an O-ring 34 fitted around its neck, i.e., the portion thereof adjacent to the upper end of the larger-diameter portion. The bushing member 35 has an inner peripheral wall surface which surrounds the outer peripheral portion of the bolt 33 to define a flow path 47 between the bushing member 35 and the bolt 33, and an outer peripheral wall surface which engages with the peripheral surface of the hole 46 so as to be slidable axially of the bolt 33. The bushing member 35 is downwardly urged by a compression spring 37 at all times. The flow path 47 communicates at its lower end with the flow path 29 in the cooling water intake member 28 and further communicates with the inlet passage 31a through a bore 48 formed in the peripheral wall of the bushing member 35. Moreover, an annular step portion 36 is formed at the position on the inner peripheral wall surface of the bushing member 35 which is adjacent to the lower side of the bore 48 so that the communication between the inlet passage 31a and the flow path 29 is cut off when the bushing member 35 moves downwardly from the position shown in FIG. 4 until the step portion 36 and the O-ring 34 abut on each other. More specifically, under the state where the chip removing tool 3 is removed from the main spindle 1; therefore, the cooling water intake member 28 is not in the position to abut the lower end of the bushing member 35 to push the same upwardly, the bushing member 35 is pushed down by the force of the compression spring 37 to cause the annular step portion 36 to engage with the O-ring 34 thereby to cut off the cooling water flow path. On the other hand, under the state shown in FIGS. 2 and 4 where the tool 3 is mounted on the main spindle 1; therefore, the bushing member 35 is pushed up by the cooling water intake member 28, the annular step portion 36 and the O-ring 34 are separate from each other. Accordingly, the cooling water introduced into the inlet passage 31a from a cooling water tank, not shown, is introduced into the tool 3 through the flow path 47. As will be obvious from the above, the bolt 33 the bushing member 35 and so forth in combination constitute a valve means for opening and closing the cooling water flow path.

The following is the description of the operation of the chip removing tool 3. It is assumed that the main spindle 1 is suspended at a predetermined angle position in order to maintain a predetermined positional relationship between the key 9 of the main spindle 1 and the two joints 26, 31. It is also assumed that the chip removing tool 3 is removed from the main spindle 1 and housed in the tool magazine, and the compressed air intake member 15 is moved toward the shank 6, i.e., toward the upper side as viewed in FIG. 1 by the force of the compression spring 20. Under this state, the notch 21 of the collar portion 22 is in engagement with the pin 23 of the flange portion 7 to disable the casing 14 from rotating with respect to the body 4. Accordingly, the compressed air intake member 15 and the cooling water intake member 28 maintain a predetermined positional relationship with respect to the key groove 8 of the flange portion 7. Under this state, the chip removing tool 3 is carried to the position of the main spindle 1 by the tool changer and mounted on the main spindle 1. At this time, the key groove 8 of the flange portion 7 of the chip removing tool 3 engages with the key 9 of the main spindle 1, and the compressed air intake member 15 enters the groove 27 of the joint 26, thereby preventing the rotation of the casing 14 with respect to the spindle head 2. At the same time, the compressed air intake member 15 abuts on the joint 26 and is downwardly pushed into the hole 17 in the projection 16 to cancel the engagement between the pin 23 of the flange portion 7 and the notch 21 of the collar portion 22. Consequently, the body 4 becomes rotatable with respect to the casing 14. Moreover, the cooling water intake member 28 enters the groove 32 of the joint 31 to upwardly push the bushing member 35 in the joint 31 thereby to open the cooling water passage. To remove chips attached to a machined surface of a workpiece, the chip removing tool 3 is moved to a necessary machined surface position. Then, according to the condition of the attached chips, one of the following three cleaning media is jetted out from the outlet 13 provided in the vicinity of the tool end: the compressed air solely; the cooling water solely; and both the compressed air and the cooling water in the mixed state. In case of employing the cooling water, the machined surface is dried by jetting out only the compressed air after the chips are removed. Moreover, in removing the chips, the compressed air and the cooling water may be jetted out along the circumference over 360° through the rotation of the body 4 of the chip removing tool 3 by revolving the main spindle 1. Furthermore, it is possible to jet out the compressed air and the cooling water while moving the chip removing tool along the machined surface.

As has been described in detail, according to the invention, the chip removing tool mounted on the main spindle of the machining center is provided with the flow path for the compressed air and the flow path for the cooling water, and the compressed air and the cooling water supplied through these two flow paths are jetted out from a single mutual outlet. Therefore, it becomes possible to jet out the compressed air and the cooling water in a mixed state in addition to the individual use of the compressed air and the cooling water. Accordingly, even the chips which cannot be removed by the prior art can be completely removed. Moreover, it is possible to completely remove chips attached to any machined surface of a workpiece, if the removal of the chips is effected by jetting out the compressed air and the cooling water along the circumference over 360° by rotating the body while moving the chip removing tool along the machined surface.

Although the invention has been described through specific terms, it is to be noted here that the described embodiment is not exclusive and various changes and modifications may be imparted thereto without departing from the scope of the invention which is limited solely by the appended claims.

What is claimed is:

1. A chip removing tool comprising:
    a body member having an upper end adapted to be attached to a rotatable main spindle of a machining center for rotation therewith;
    a casing surrounding the outer periphery of said body;
    a compressed air intake member having a lower part unrotatably fitted in said casing, said compressed air intake member being longitudinally movable between a projecting position taken when it is moved upwardly and a retracting position taken when it is moved downwardly, said compressed air intake member being constantly urged toward said projecting position by a spring;
    a mutual engagement means adapted to lock both said body and compressed air intake member so that they cannot rotate relatively to each other, only when said compressed air intake member is in said projecting position, thereby to lock said casing so that it cannot rotate with respect to said body;
    a cooling water intake member having a lower part secured in said casing;
    means defining an air flow path longitudinally extending through said compressed air intake member and passing through said casing and then downwardly extending through said body to communicate with means defining an outlet provided in the vicinity of the lower end of said body; and
    means defining a cooling water flow path longitudinally extending through said cooling water intake member and passing through said casing and then downwardly extending through said body to communicate with said outlet,
    wherein, when the upper end of said body is attached to said main spindle, said compressed air intake member abuts a first joint having an air inlet passage and provided on said spindle head of said machining center and is moved to said retracting position, and said air inlet passage and air flow path are allowed to communicate with each other, and at the same time, said cooling water intake member is allowed to communicate with a cooling water inlet passage formed in a second joint provided on said spindle head.

2. A method of cleaning a machined surface comprising:

mounting a chip removing tool having a compressed air flow path and a cooling water flow path, respectively, on a main spindle of a machining center, said pair of flow paths communicating with a mutual outlet;

rotating said chip removing tool unitarily with said main spindle whereby said mutual outlet rotates;

simultaneously jetting out compressed air and cooling water from said mutual outlet, thereby to remove chips attached to a machined surface of a workpiece; and thereafter, jetting out only said compressed air from said outlet to dry said machined surface.

3. A chip removing tool comprising:

a body member having an upper end adapted to be attached to a rotatable main spindle of a machining center for rotation therewith;

a casing surrounding the outer periphery of said rotatable body member;

compressed gas means in said casing;

liquid supply means in said casing;

gas conduit means longitudinally extending through said rotatable body member to communicate with an outlet means provided in the vicinity of the lower end of said body member;

liquid conduit means longitudinally extending through said body member to also communicate with said outlet means; and cooperating rotary seal means on said body member and said casing for fluid tight communication between said compressed gas means in said casing and said gas conduit means in said body member and between said liquid supply means in said casing and said liquid conduit means in said body member;

whereby, when the upper end of said body member is attached to said main spindle, said gas supply and gas conduit means communicate with each other, and said liquid supply means communicates with said liquid conduit means, so that gas and liquid can be discharged out of said outlet means while the latter is undergoing the rotational motion of said main spindle.

* * * * *